United States Patent

[11] 3,539,044

| [72] | Inventor | Oswald B. Grimstad |
| | | Rockville Centre, New York |
| [21] | Appl. No. | 740,560 |
| [22] | Filed | June 27, 1968 |
| [45] | Patented | Nov. 10, 1970 |
| [73] | Assignee | By mesne assignments, to |
| | | United Parcel Service General Services Co., |
| | | New York, New York |
| | | a corporation of Delaware. |

[54] SELF-SYNCHRONIZING CLUTCH
2 Claims, 3 Drawing Figs.

[52] U.S. Cl. ........................................... 192/67,
192/108, 192/48.91, 192/21
[51] Int. Cl. ........................................... F16d 23/02
[50] Field of Search ........................... 192/67, 108

[56] References Cited
UNITED STATES PATENTS

| 2,068,260 | 1/1937 | Biggert | 192/108X |
| 2,384,418 | 9/1945 | Edmondson | 192/67 |
| 2,535,388 | 12/1950 | Burks et al. | 192/108X |
| 2,667,252 | 1/1954 | Meyer | 192/108X |

FOREIGN PATENTS

| 722,969 | 7 1942 | Germany | 192/67 |
| 361,027 | 11/1931 | Great Britain | 192/67 |

Primary Examiner—Benjamin W. Wyche, III
Attorney—James A. Drobile

ABSTRACT: Torque transmitting apparatus having two intermeshed helical gears which employs the axial thrust of the helical gears to shift the driven gear longitudinally along its axis, in a direction dependent upon the direction of rotation of the driving gear so as to effect a clutching action between the driven gear and alternately one of two output members disposed on either side of the driven helical gear. Apparatus for synchronizing a positive engaging ratchet tooth clutch including a cam surface on one of the clutch members and a cam follower on the other clutch member to cam the moveable clutch member longitudinally relative to the stationary clutch member while maintaining the ratchet teeth out of engagement one with another until the moveable clutch member has moved through its full longitudinal travel and into complete engagement with the other clutch member.

INVENTOR
OSWALD B. GRIMSTAD

BY James Albert Devlin

ATTORNEY

Patented Nov. 10, 1970

INVENTOR
OSWALD B. GRIMSTAD
BY James Albert Drobile
ATTORNEY 3,539,044

SELF-SYNCHRONIZING CLUTCH

SUMMARY OF THE INVENTION

The present invention is concerned with clutches and, more specifically, is directed to apparatus for providing synchronization in a positive action type of clutch which employs two rotating members which are engaged by longitudinal movement of one member with respect to the other.

One type of positive action clutch frequently found in use is a clutch employing two rotating members mounted on a common shaft and which effect their clutching action by means of longitudinal movement of one of the members with respect to the other. Clutches of this type employ clutch elements disposed on each of the members, which elements positively lock into engagement one with the other as the clutch members are brought longitudinally together. Clutches of this type, as distinguished from disc type clutches also in common use, can come into locking engagement only at given rotational orientations, as determined by the particular design of the interengaging clutch elements. Frequently, in clutches of this type, the interengaging clutch elements will not be properly aligned as the two clutch members move together. If the force holding the clutch members in engagement is sufficient, the clutch may transmit torque with the clutch elements improperly aligned, resulting in undue wear on the clutch elements. Additionally, sudden torque demands on a clutch of this type, in which the clutch elements are improperly aligned, may cause the clutch elements suddenly and violently to come into proper alignment with possible resulting damage or destruction of the clutch.

It is an object of the present invention to provide a novel self-synchronizing clutch of the positive action type which affords significant advantages and avoids the aforementioned difficulties with clutches of that type, by providing means on the clutch members to ensure that the clutch elements are properly aligned for interengagement before permitting the clutch members to reach the full limit of longitudinal movement.

In one embodiment of the present invention, the clutch elements on the clutch members are prevented from engaging one another until properly oriented for such engagement, by utilizing cooperating camming surfaces on the two members. The camming surfaces may include a cam face on one of the clutch members and a cam face or a cam follower on the other. Where a cam follower is so employed, an appropriate detent is provided at the end of the cooperating cam face, into which detent the cam follower may pass when the clutch members reach the limit of their longitudinal movement so as not to interfere with the positive engagement of the clutch elements.

Other objects and advantages of the invention will become more fully apparent from an examination of the following specification and claims and the accompanying drawings.

DETAILED DESCRIPTION OF THE INVENTION

Figure 1:
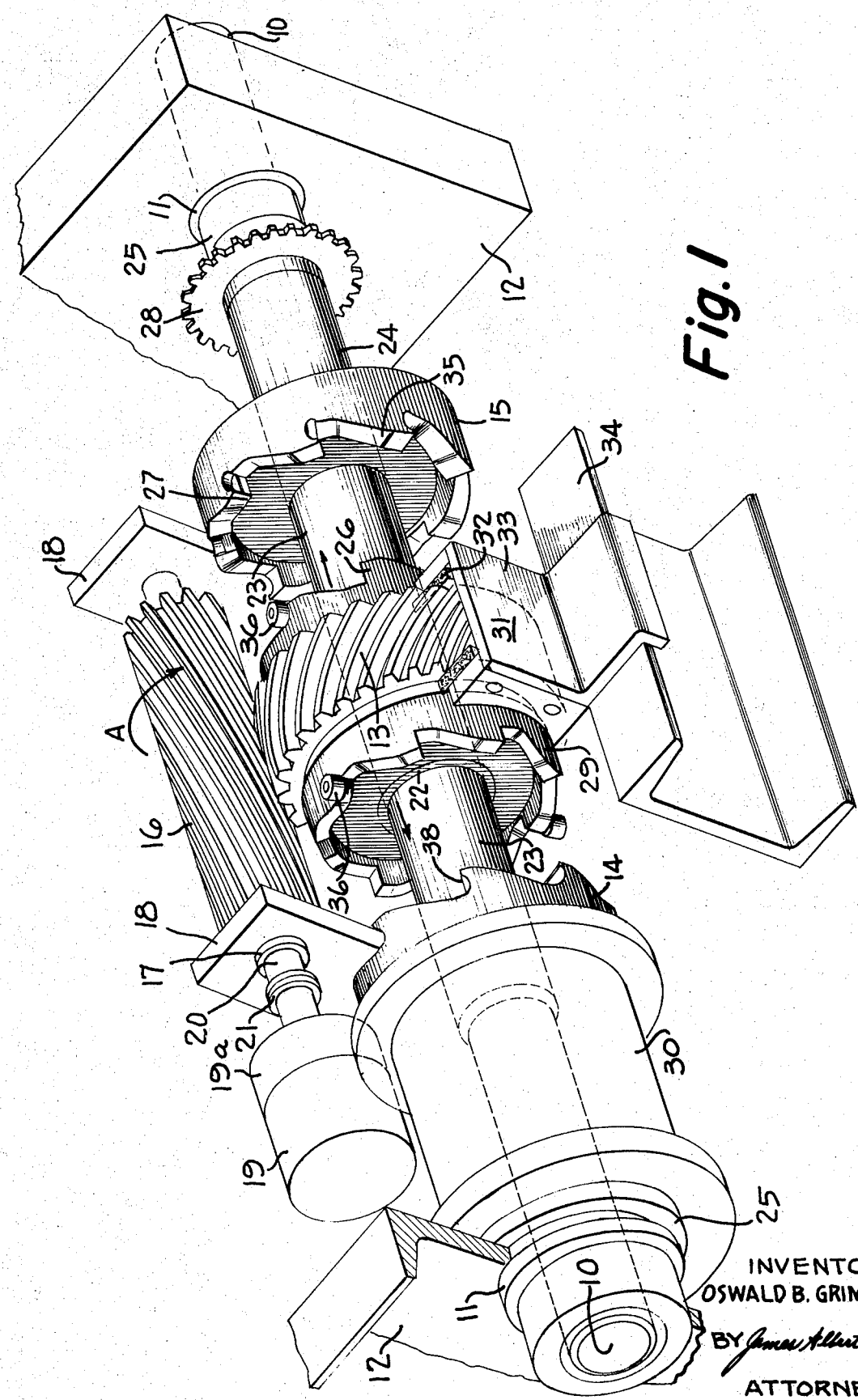
FIG. 1 is a perspective view of the novel transmission apparatus, and of one embodiment of the novel self-synchronizing clutch apparatus.

As shown in FIG. 1, a transmission apparatus employing one embodiment of the clutch apparatus of the present invention includes a carrier shaft 10 suitably journaled by means of bearings 11 in bearing blocks 12 at either end of the shaft. The carrier shaft 10 is continuous between the bearing blocks 12 and supports a driven gear 13 and two output clutch members 14 and 15 as hereinafter described.

In driving engagement with gear 13 is an elongated driving gear 16 which is supported by means of a drive shaft 20 which is suitably journaled in bearings 17 disposed within support blocks 18 at either end of the shaft 20. A drive motor 19 and speed reduction mechanism 19a likewise suitably supported within the apparatus provide the driving torque for the transmission through a drive coupling 21.

Gears 13 and 16, in the embodiment shown, are helical gears. It is inherent with helical gears that the driving force in the plane normal to that of the teeth of the helical gear is composed of two force components, viz., one in the diametral plane of the gear and the second constituting an end thrust or axial or longitudinal thrust on the helical gear. The magnitude of this end thrust depends upon the torque being transmitted and the helix angle of the gear. The direction of the end thrust is dependent initially upon the direction of the helix angle. However, the direction of the end thrust will reverse upon a reversal of the torque being applied to the driven gear, i.e., upon a reversal in the direction of rotation of the driving gear.

Returning to the embodiment of FIG. 1, the helical gear 13 is shown as journaled by means of bearings 22 on an inner idler shaft 23, which is free to rotate on the carrier shaft 10. The bearings 22 are not locked on the inner idler shaft 23, but allow the helical gear 13 to be displaced in either direction longitudinally along the inner idler shaft 23 in the direction of the two output clutch members 14 and 15.

The output clutch member 15 is bolted to a similar idler shaft 24 and thus is secured against longitudinal movement thereon, but is free to rotate with the idler shaft which is freely journaled on the carrier shaft 10. The output clutch member 14 similarly is secured to an idler shaft (not visible in FIG. 1) and likewise is secured against longitudinal movement but is free to rotate. Thrust sleeves 25 at either end of the two outer idler shafts secure the idler shafts against longitudinal movement.

Assuming now that the drive motor 19 and speed reducer 19a are rotating the driving gear 16 in the direction of the arrow A, the side thrust on the driven helical gear 13 will be to the right toward the output clutch member 15. This resultant side thrust will cause the driven gear 13 to be displaced longitudinally along the driving gear 16 and into engagement with the output clutch member 15. The plurality of ratchet teeth 26 on the driven gear 13 will then come into engagement with a corresponding complimentary plurality of ratchet teeth 27 on the output clutch member 15. The driving force of the transmission will then be transmitted to the idler shaft 24 from which it may be taken off as, for example, by means of a sprocket wheel 28.

Assuming now that the direction of rotation of the driving gear 16 is reversed by reversing the direction of motor 19, the direction of rotation of the driven gear 13 will now reverse and, consequently, the direction of end thrust on the gear 13 will be to the left in the direction of the output clutch member 14. As the driven gear 13 reverses its longitudinal direction, the corresponding ratchet teeth 26 and 27 will separate and the resultant end thrust will displace the driven gear 13 longitudinally along the idler shaft 23. When the driven gear 13 reaches the output clutch member 14, similar but oppositely disposed ratchet teeth 29 on the driven gear 13 engage corresponding ratchet teeth (not visible in FIG. 1) on the output clutch member 14. The resultant torque flow through the transmission is now to the end idler shaft supporting the output clutch member 14, and may be taken off from the transmission by any suitable means such as here shown to be a winch drum 30.

To assure positive and prompt shifting of the transmission, a friction drag brake 31 is employed. This drag brake employs two spring-loaded friction blocks 32 which are carried by a supporting member 33, and which are in compressive, frictional contact with the corresponding side faces of gear 13. The supporting member 33 is keyed to a rail 34 so as to be free to move longitudinally along with the driven gear 13. The resultant drag of the brake 31 on the driven gear 13 will ensure that the longitudinal or axial force component of the torque being transmitted between the driving and driven gears is sufficient to effect the longitudinal shifting action of the driven gear.

In accordance with the present invention, synchronization of the ratchet clutch elements employed preferably is accomplished by means of at least one and preferably a plurality of cam faces on one of the clutch elements, i.e., on an output clutch member or on the clutch element on the driven gear, cooperating with at least one and preferably a plurality of cam followers on the other clutch element. Both the cam face or faces and the cooperating cam follower or followers are disposed at a common radius beyond that of the ratchet teeth. In one embodiment, both of the output clutch members include at least one and preferably a plurality of cam faces at a radius beyond that of the ratchet teeth, and at least one and preferably a plurality of cam followers are, in like manner, disposed on each side of the driven gear at a radial distance equal to that of the cam face or faces.

Figure 2:
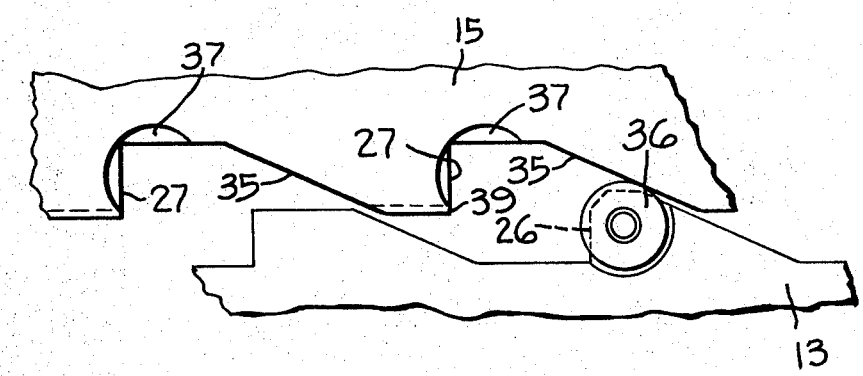
FIG. 2 is a partial side view of the novel self-synchronizing clutch apparatus moving into engagement.
Figure 3:
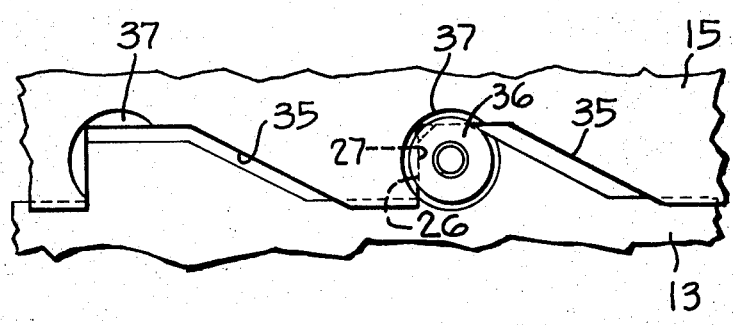
FIG. 3 is a partial side view of the novel self-synchronizing clutch apparatus in engagement.

In the embodiment shown in FIG. 1, the axis of rotation of the cam followers 36 is perpendicular to the axis of rotation of the driven gear 13, and each is so sized and positioned that its outer cylindrical surface is disposed slightly beyond the outer surface of the underlying clutch tooth, which also can be cut back. The cam faces 35 are disposed in a plane parallel to the transverse axes of the output clutch member and generally inclined at an angle with respect to the longitudinal axis thereof. As the driven gear 13 approaches the output clutch member 15, as shown in FIG. 2, the cam follower 36 will come into rolling contact with the cam face 35. The contour of the cam face 35 and the dimensions of the cam follower 36 are so designed that, when in such contact, they will prevent the ratchet teeth 26 and 27, of the driven gear 13 and output clutch member 15, respectively, from engaging one another until the driven gear 13 is in proper angular synchronization with the output clutch member 15 and has, as well, reached the limit of its longitudinal travel into engagement with the output clutch member 15. When this point is reached between the driven gear 13 and the output clutch member 15, as shown in FIG. 3, the cam follower 36 is permitted to pass into an oversized detent 37 at the end of the cam surface 35. The detent 37 permits the ratchet teeth 26 and 27 to positively engage one another without further separation or interference by the cam follower 36.

Regardless of the angular alignment of the ratchet teeth 26 and 27 upon initial approach of the clutch elements, the cam follower 36 will assure proper synchronization. For example, if upon the first contact of the cooperating clutch elements, the edge of the ratchet tooth 26 of the driven gear 13 were in interfering alignment with the edge of the ratchet tooth 27 of the output clutch member 15, then, in the absence of the cam follower 36, the teeth would bear unreasonably on one another and this possibly would result in damage to the ratchet teeth. However, with the cam follower 36, the opposing teeth in such a position cannot engage one another, and the driven gear 13 and the output clutch member 15 will be displaced axially relative to one another by the cam follower either rolling directly down into the detent 37 or rolling upwardly over the outer edge 39 of the cam face and then normally down the cam face 35 as above described.

The output clutch 14 includes identical but oppositely-disposed cam faces 38 thereon, which operate in conjunction with the cam followers 36 disposed on the opposite side of the gear 13 to effect synchronization and engagement of the clutch elements in the same manner as above described whenever the driven gear 13 is displaced toward the output clutch member 14.

The rolling action provided by the cam follower on the cam face will eliminate sliding action between the ratchet teeth prior to engagement, thus avoiding wear of the ratchet teeth, and will as well assure perfect synchronization between the ratchet teeth upon engagement. Further, due to the reduced resistance of the rolling action in contrast to sliding action, the ease of engagement and disengagement of the clutch is decisively improved.

In a transmission apparatus illustrating a specific embodiment of the self-synchronizing clutch of the present invention, the driving gear was about 3.5 inches in pitch diameter, about 4 inches in axial width, and had 20 teeth. The driven gear was about 10.1 inches in pitch diameter, about 2¾ inches in axial width, and had 57 teeth. The helix angle of both gears was 45°. By virtue of a motor and speed reducer, the driving gear was operated at approximately 3 r.p.m. and transmitted a torque of 675 foot pounds. A drag brake induced a drag in the driven gear of between about 3 and 5 foot pounds.

The driven gear included a similar but oppositely-disposed clutch element on each of its opposing side faces. The clutch elements consisted of eight diametral ratchet jaws or teeth about one-half inch in height and equally-spaced in an annular area about 7¾ inches in outside diameter. Disposed radially outside of the plane of such teeth, and extending to an outside diameter of about 8½ inches, were eight equally-spaced and identical cam faces, each extending circumferentially and generally towards the base of the teeth of the clutch element to an oversized semicylindrical detent about ⅜ inch in diameter. Each of the output members disposed on opposite sides of the driven gear included eight equally-spaced ratchet jaws or teeth adapted in size and configuration to cooperate with the opposing clutch element on the driven gear. Mounted radially outside of these teeth, on separate shafts generally perpendicular to the axis of rotation of the clutch member, and extending to an outer diameter of about 8½ inches, were two diametrically-opposed cylindrical cam followers of about five-sixteenths inch in outer diameter. Each of these cam followers was so positioned that its circumference extended slightly beyond the outermost extremity of the underlying tooth, such tooth being slightly attenuated in height and modified in shape to permit of contact only between the cam follower and its cooperating cam faces. In neutral position, the minimum clearance between the cam follower and the opposing cam face was about one-eighth inch on each side of the driven gear.

The driven gear and its opposing output members were mounted on separate shaft elements having a common axis which was parallel to the axis of the driving gear. The driving gear and the two output clutch members were adapted for independent rotational movement alone, while the driven gear was adapted for both axial and rotational movement.

In operation, the above-specified transmission apparatus performs generally as hereinbefore described, to shift the output alternatively between the two output members in response to a change in the direction of rotation of the driving gear.

The foregoing apparatus has been described with respect to a particular and preferred embodiment thereof. However, it is anticipated that the concepts may be embodied in other arrangements of gears which will produce side thrusts other than those disclosed. Likewise, it is anticipated that configurations of camming means other than that shown in the drawings may be utilized in accordance with the concept of the present invention for synchronizing the ratchet teeth or other clutch elements.

The torque-responsive automatic transmission apparatus herein disclosed also is disclosed, and is claimed, in the copending application of Roy F. LoPresti, Edwin A. Peterson, and Oswald B. Grimstad, entitled "Torque-responsive Transmission", of even filing date herewith, Ser. No. 740,708.

I claim:
1. A self-synchronizing clutch comprising:
 a. a first clutch member supported for rotational movement;
 b. a second clutch member supported for rotational and longitudinal movement with respect to an axis common to said clutch member;
 c. said clutch members having opposing faces each comprising a plurality of spaced teeth adapted for positive engagement therebetween upon longitudinal displacement of said second clutch member toward said first clutch member, each tooth having an outer face and an engaging face;

d. at least one cam follower having a circular cross section and rotatably mounted on one of the teeth of said second member and extending at least partially beyond the outer face and the engaging face of the tooth upon which it is mounted;

e. an elongated, inwardly inclined cam surface defined by said first clutch member and occupying a substantial extent of the distance between each pair of adjacent teeth; and f. a detent defined by each tooth of said first clutch member proximate its engaging face and adapted to receive the portion of the cam follower of said second clutch member which extends beyond the outer and engaging faces of the tooth upon which such cam follower is mounted, whereby driving engagement between adjacent faces of the teeth of the opposing clutch members is accomplished when said cam follower is mounted in said detent.

2. A self-synchronizing clutch as set forth in claim 1, wherein said teeth are ratchet teeth, and each of said teeth has a substantially planar outer face, a substantially planar, axially extending engaging face, and a substantially planar, inclined cam follower surface extending from the outer face thereof.